(12) United States Patent
Lee et al.

(10) Patent No.: US 7,292,882 B2
(45) Date of Patent: Nov. 6, 2007

(54) PORTABLE DIGITAL COMMUNICATION DEVICE USABLE AS A GAMING DEVICE AND A PERSONAL DIGITAL ASSISTANT (PDA)

(75) Inventors: Young-Keun Lee, Seoul (KR); Mark Gullickson, Rancho Dominguez, CA (US); Seiji Morioka, Rancho Dominguez, CA (US); Mark Sterzick, Rancho Dominguez, CA (US); Jeff Higashi, Rancho Dominguez, CA (US)

(73) Assignee: Samsung Electronics Co., Ltd. (KR)

( * ) Notice: Subject to any disclaimer, the term of this patent is extended or adjusted under 35 U.S.C. 154(b) by 332 days.

(21) Appl. No.: 10/946,838

(22) Filed: Sep. 22, 2004

(65) Prior Publication Data

US 2005/0107119 A1 May 19, 2005

Related U.S. Application Data

(60) Provisional application No. 60/504,894, filed on Sep. 22, 2003.

(30) Foreign Application Priority Data

Nov. 10, 2003 (KR) .................. 10-2003-0079104

(51) Int. Cl.
*H04M 1/00* (2006.01)

(52) U.S. Cl. .................. 455/575.4; 455/575.1; 455/575.8; 455/90.1

(58) Field of Classification Search ............ 455/575.4, 455/575.1, 575.2, 575.3, 575.6, 575.7, 575.9, 455/575.5, 575.8, 550.1, 90.1
See application file for complete search history.

(56) References Cited

U.S. PATENT DOCUMENTS

| | | | |
|---|---|---|---|
| 6,157,718 A * | 12/2000 | Kaschke .................. | 455/569.1 |
| 6,751,473 B1 * | 6/2004 | Goyal et al. .............. | 455/556.1 |
| 6,950,516 B2 * | 9/2005 | Pirila et al. .............. | 455/575.4 |
| 6,993,128 B2 * | 1/2006 | Eromaki .................. | 455/575.4 |
| 7,023,421 B2 * | 4/2006 | Wong et al. ................ | 455/566 |
| 7,076,058 B2 * | 7/2006 | Ikeuchi et al. ......... | 379/433.12 |
| 7,120,458 B2 * | 10/2006 | Wendorff et al. ........ | 455/550.1 |
| 2005/0070348 A1 * | 3/2005 | Lee et al. ................ | 455/575.4 |
| 2005/0107119 A1 * | 5/2005 | Lee et al. ................ | 455/556.2 |
| 2005/0124394 A1 * | 6/2005 | Kim et al. ............... | 455/575.3 |
| 2005/0130720 A1 * | 6/2005 | Finke-Anlauff .......... | 455/575.3 |

FOREIGN PATENT DOCUMENTS

| | | |
|---|---|---|
| CN | 1441611 | 9/2003 |
| WO | WO 01/99481 A2 | 12/2001 |

* cited by examiner

*Primary Examiner*—Lana N. Le
(74) *Attorney, Agent, or Firm*—The Farrell Law Firm, P.C.

(57) ABSTRACT

Disclosed herein is a portable digital communication device usable as a gaming device and a personal digital assistant. The device comprises a body housing, a center sliding housing for opening or closing a top surface of the body housing while being continuously opposite to the top surface of the body housing, and at least one side sliding housing attached to a side surface of the body housing and adapted to slide while being continuously opposite to the side surface of the body housing. The side sliding housing is arranged in parallel with the center sliding housing.

20 Claims, 6 Drawing Sheets

PORTABLE DIGITAL COMMUNICATION DEVICE USABLE AS A GAMING DEVICE AND A PERSONAL DIGITAL ASSISTANT (PDA)

This application claims the benefit of U.S. Provisional Application No. 60/504,894, filed Sep. 22, 2003, and claims priority under 35 U.S.C. § 119 to an application entitled "PORTABLE DIGITAL COMMUNICATION DEVICE USABLE AS GAME MACHINE AND PDA" filed in the Korean Intellectual Property Office on Nov. 10, 2003 and assigned Ser. No. 2003-79104, the contents of each of which are hereby incorporated by reference.

BACKGROUND OF THE INVENTION

1. Field of the Invention

The present invention relates to a portable digital communication device including cellular phones, personal digital assistants and hand held phones, and more particularly to a portable digital communication device that can be used as a gaming device and a personal digital assistant (PDA).

2. Description of the Related Art

Generally, the term "portable communication devices" refers to devices that are portable and enable the owners of the devices to conduct wireless communications. Such portable communication devices have become increasingly small, slim, and lightweight, which in turn increases their portability. Furthermore, such portable communication devices have been adapted to handle multimedia, whereby the devices have various additional functions. Future portable communication terminals will be miniaturized, lightweight, multipurpose terminals with various functions, which will be easily adapted to various multimedia and Internet environments. The portable communication terminals are electronic devices commonly used by people of all ages and both sexes all over the world, which are considered as necessities of life.

The portable communication devices can be classified into several types of communication devices. For example, the portable communication devices may be classified into a bar-type communication device, a flip-type communication device, and a folder-type communication device. The bar-type communication device has a bar-type single housing, the flip-type communication device comprises a bar-type housing and a flip part pivotally attached to the housing, and the folder-type communication device comprises a bar-type housing and a folder part pivotally attached to the housing. The portable communication device may also be classified into a necklace-type communication device and a wrist-type communication device. The necklace-type communication device is worn on the neck of a user by means of a string, and the wrist-type communication device is worn on the wrist of the user.

On the basis of how the devices are opened or closed, the portable communication device may be further classified into a rotating-type communication device and a sliding-type communication device. The rotating-type communication device is characterized in that two housings are rotatably connected to each other. The rotating-type communication device is opened or closed by the rotation of the two housings in such a manner that the housings are rotated apart from or onto each other. The sliding-type communication device is characterized in that two housings are slid apart from each other in a longitudinal direction. The sliding-type communication device is opened or closed by the sliding movement of the two housings in such a manner that the housings are slid apart from or onto each other. The above-mentioned various types of communication devices will be easily appreciated by a person having an ordinary skill in the art to which the present invention pertains.

The portable communication devices have also been adapted to transmit/receive data at high speeds in addition to an audio communication function. Consequently, the portable communication devices use wireless communication technology for transmitting data at high speeds.

It is another increasing trend that a camera lens is adopted in each portable communication device to transmit image signals. The portable communication device has a camera lens module mounted outside or inside a main body of the portable communication device so that a user of the device can talk with another user of a similar device while viewing images of each other, or take pictures of his/her desired subjects.

However, it is difficult to use the conventional portable communication device not only as a game but also as a PDA. A user needs to carry a separate PDA and a game, which is inconvenient for the user. Furthermore, the conventional portable communication device with a game function has a problem in that a key operation is very inconvenient. The key operation must be performed quickly and accurately in a game operating mode; however, the key operation using numerical or character keys on the conventional portable communication device is not performed quickly and accurately. Such a slow and inaccurate key operation does not satisfy the desires of the user.

SUMMARY OF THE INVENTION

Therefore, the present invention has been made in view of at least the above problem, and it is an object of the present invention to provide a portable digital communication device which can be conveniently used in a game operating mode as well as in a PDA operating mode.

It is another object of the present invention to provide a portable digital communication device comprising two side sliding housings which can be moved in a sliding manner so that a key operation can be conveniently performed in a game operating mode using both hands.

It is yet another object of the present invention to provide a portable digital communication device including four or more key arrays, to increase the ease of performing a key operation in a game operating mode as well as in a PDA operating mode.

In accordance with one aspect of the present invention, the above and other objects can be accomplished by the provision of a portable digital communication device usable as a game and a personal digital assistant, including a body housing; a center sliding housing for opening or closing a top surface of the body housing while being continuously opposite to the top surface of the body housing; and at least one side sliding housing attached to a side surface of the body housing and adapted to slide while being continuously opposite to the side surface of the body housing, the side sliding housing preferably being arranged in parallel with the center sliding housing.

In accordance with another aspect of the present invention, there is provided a portable digital communication device usable as a game machine and a personal digital assistant, including a body housing; at least one stationary housing extending horizontally from the body housing; a center sliding housing for opening or closing a top surface of the body housing while being continuously opposite to the top surface of the body housing; and at least one side sliding housing attached to a side surface of the body housing and adapted to slide while being continuously opposite to the side surface of the body housing, the side sliding housing preferably being arranged in parallel with the center sliding housing and adapted to slide while being continuously opposite to a top surface of the stationary housing for opening or closing the top surface of the stationary housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
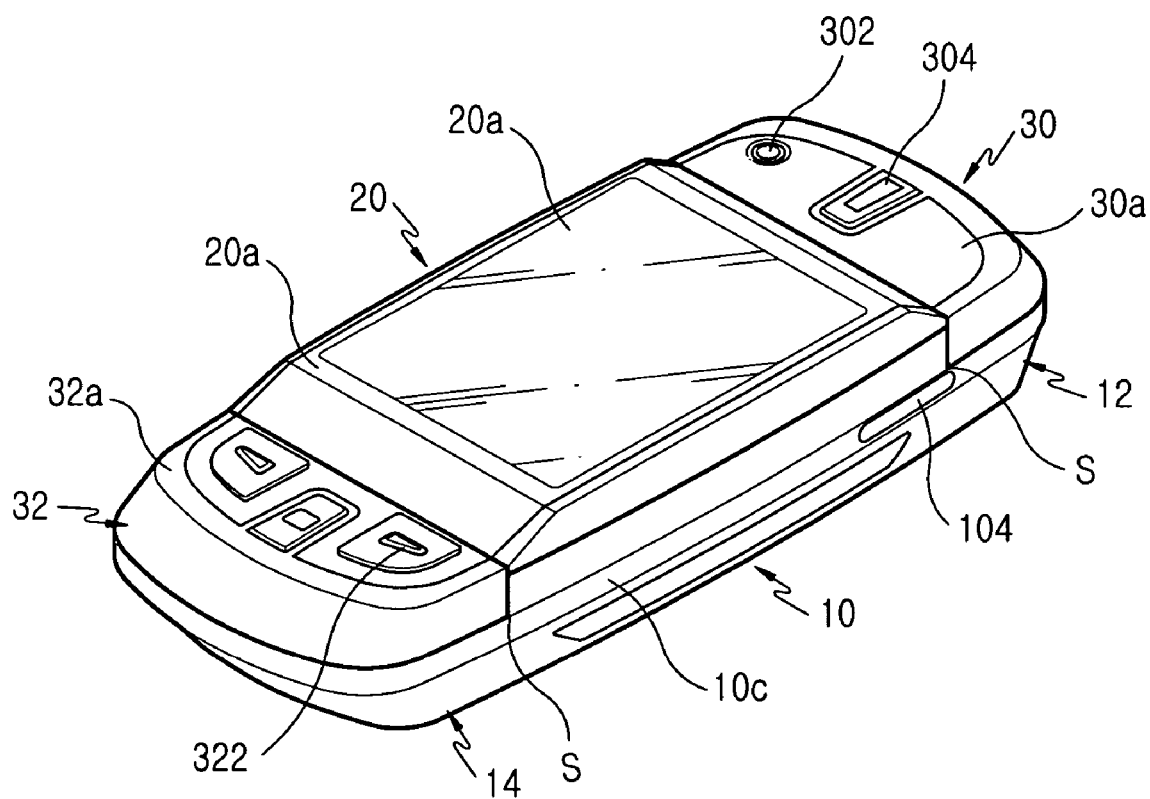
FIG. 1 is a perspective view showing a portable digital communication device usable as a game machine and a PDA according to a preferred embodiment of the present invention.
Figure 2:
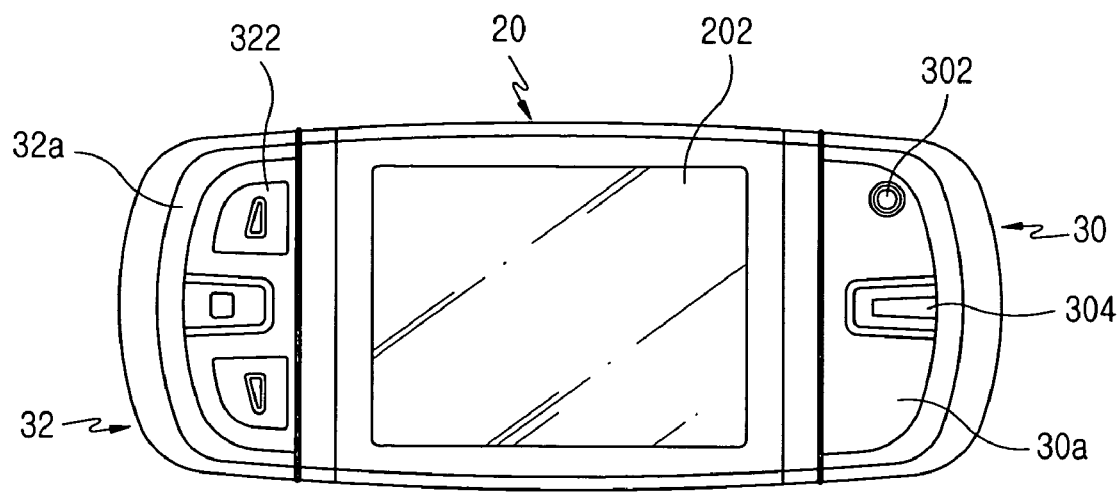
FIG. 2 is a plane view of the portable digital communication device shown in FIG. 1.
Figure 3:
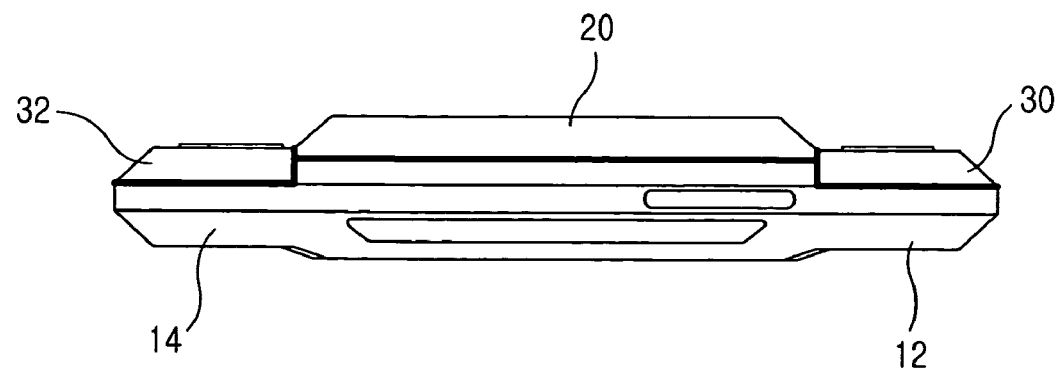
FIG. 3 is a side view of the portable digital communication device shown in FIG. 1.

Now, a preferred embodiment of the present invention will be described in detail with reference to the accompanying drawings. In the following, a detailed description of known functions and configurations incorporated herein will be omitted when it may obscure the subject matter of the present invention.

Referring to FIGS. 1 to 7, it is easily understood that a portable digital communication device of the present invention can be conveniently used not only as a PDA but also as a gaming device. In other words, the portable digital communication device of the present invention can be used as a PDA in a PDA operating mode and as a gaming device in a game operating mode. It should be noted that the portable digital communication device of the present invention includes a wide display unit and a plurality of keys arranged to conveniently perform key operations.

The portable digital communication device of the present invention includes a body housing 10; at least one stationary housing 12, 14 extending out from both sides of the body housing 10; a center sliding housing 20 adapted to slide while being continuously opposite to a top surface 10a of the body housing 10; and a first side sliding housing 30 and a second slide housing 32 adapted to slide in parallel with the center sliding housing 20 while being continuously opposite to a side surface 10b-1, 10b-2 of the body housing 10. Although two side slide housings 30 and 32 are shown, the present invention could have only one side slide housing.

Specifically, the portable digital communication device of the present invention includes a body housing 10; two stationary housings 12 and 14 horizontally extending from both sides of the body housing 10, respectively; a center sliding housing 20 for opening or closing a top surface 10a of the body housing 10 while being continuously opposite to the top surface 10a of the body housing 10; and two side sliding housings 30 and 32 attached to both side surfaces 10b-1 and 10b-2 of the body housing 10, respectively, and adapted to slide while being continuously opposite to the corresponding side surfaces 10b-1 and 10b-2 of the body housing 10. The side sliding housings 30 and 32 being parallel with the center sliding housing 20 and adapted to slide while being continuously opposite to top surfaces 12a and 14a of the stationary housings 12 and 14, respectively, for opening or closing the corresponding top surfaces 12a and 14a of the stationary housings 12 and 14.

The top surface 10a of the body housing 10 is moved in a sliding motion while being continuously opposite to a bottom surface 20c of the center sliding housing 20. The side surfaces 10b-1 and 10b-2 of the body housing 10 are moved in a sliding motion while being opposite to side surfaces 20b-1 and 20b-2 of the center sliding housing 20, respectively. Also, the top surfaces 12a and 14a of the stationary housings 12 and 14 are moved in a sliding motion while being opposite to bottom surfaces 30c and 32c of the side sliding housings 30 and 32, respectively.

The body housing 10 further includes a front surface 10c and a bottom surface 10d in addition to the top surface 10a and the side surfaces 10b-1 and 10b-2. On the top surface 10a of the body housing 10 is arranged a first key array 102 comprising a plurality of keys. For example, the first key array 102 comprises 40 to 45 keys, which are used to perform a PDA function. The first key array 102 includes character keys, numeric keys, a space key, shift keys, and function keys, which are used to input various numerals, complex characters, and special symbols.

The center sliding housing 20 further includes a top surface 20a in addition to the bottom surface 20c and the side surfaces 20b-1 and 20b-2. On the entire top surface 20a of the center sliding housing 20 is arranged a display unit 202. For example, the display unit 202 may be an LCD module, a touch screen, or a hologram screen. The hologram screen may be a two-dimensional hologram screen or a three-dimensional hologram screen. The two-dimensional hologram screen is characterized in that data is displayed on the screen surface, and the three-dimensional hologram screen is characterized in that data is displayed at a short distance from the screen surface.

The body housing 10 and the center sliding housing 20 are formed such that the lengths of the body housing 10 and the center sliding housing 20 are larger than the widths of the body housing 10 and the center sliding housing 20. As a result, a user can easily perform a key operation using his/her fingers while watching the display unit 202 in a game operating mode shown in FIG. 5. It has been proven that playing a game is very convenient while keys on a game machine are operated using both hands of a user.

The center sliding housing 20 and the side sliding housings 30 and 32 are moved in a sliding motion in opposite directions to each other. For example, the coupling/separating direction of the center sliding housing 20 is opposite to the coupling/separating direction of each of the side sliding housings 30 and 32.

The stationary housings 12 and 14 include a first stationary housing 12 integrally formed with the side 10b-1 of the body housing 10, and a second stationary housing 14 integrally formed with the side 10b-2 of the body housing 10. The first and second stationary housings 12 and 14 are spaced apart from each other and preferably arranged in a symmetrical fashion. The top surface 10a of the body housing 10 is not flush with the top surfaces 12a and 14a of the stationary housings 12 and 14. The top surface 10a of the body housing 10 is connected to the top surfaces 12a and 14a of the stationary housings 12 and 14 such that the top surface 10a of the body housing 10 and each of the top surfaces 12a and 14a of the stationary housings 12 and 14 together form a step-shaped portion S.

The side sliding housings 30 and 32 comprise a first side sliding housing 30 attached to the side surface 10b-1 of the body housing 10 for opening or closing in a sliding motion the top surface 12a of the first stationary housing 12, and a second side sliding housing 32 attached to the side surface 10b-2 of the body housing 10 for opening or closing in a sliding motion the top surface 14a of the second stationary housing 14. The first and second side sliding housings 30 and 32 are preferably arranged symmetrically to each other about the body housing 10.

The first side sliding housing 30 includes a side surface 30b, which is moved in a sliding motion while being continuously opposite to the side surface 20b-1 of the center sliding housing 20. Similarly, the second side sliding housing 32 includes a side surface 32b, which is moved in a sliding motion while being continuously opposite to the side surface 20b-2 of the center sliding housing 20.

The side surface 30b of the first side sliding housing 30 is moved in a sliding motion while being continuously opposite to the side surface 10b-1 of the body housing 10. Similarly, the side surface 32b of the second side sliding housing 32 is moved in a sliding motion while being continuously opposite to the side surface 10b-2 of the body housing 10.

On the top surface 30a of the first side sliding housing 30 is arranged a single key 304. On the top surface 30a of the first side sliding housing 30 is also mounted a camera lens 302, which is disposed next to the key 304.

On the top surface of the second side sliding housing 32 is arranged a second key array 322 that includes at least one key.

On the top surface 12a of the first stationary housing 12 is arranged a third key array 122 that includes a plurality of keys. On the top surface 14a of the second stationary housing 14 is arranged a fourth key array 142 that includes a plurality of keys. The first and second stationary housings 12 and 14 are preferably arranged symmetrically to the first and second side sliding housings 30 and 32 about the body housing 10 while the first and second stationary housings 12 and 14 are spaced apart from the first and second side sliding housings 30 and 32 by means of the body housing 10. The fourth key array 142 comprises four direction keys, which are used in the game operating mode.

On the front surface 10c of the body housing 10 is arranged a fifth key array 104 that includes at least one key.

When the center sliding housing 20 of the portable digital communication device is in its closed position as shown in FIG. 1, the display unit 202 is next to the second key array 322, the single key 304 and the camera lens 302. When the center sliding housing 20 of the portable digital communication device is slid into its open position as shown in FIG. 4, the first key array 102 is next to the second key array 322, the single key 304 and the camera lens 302.

Figure 4:
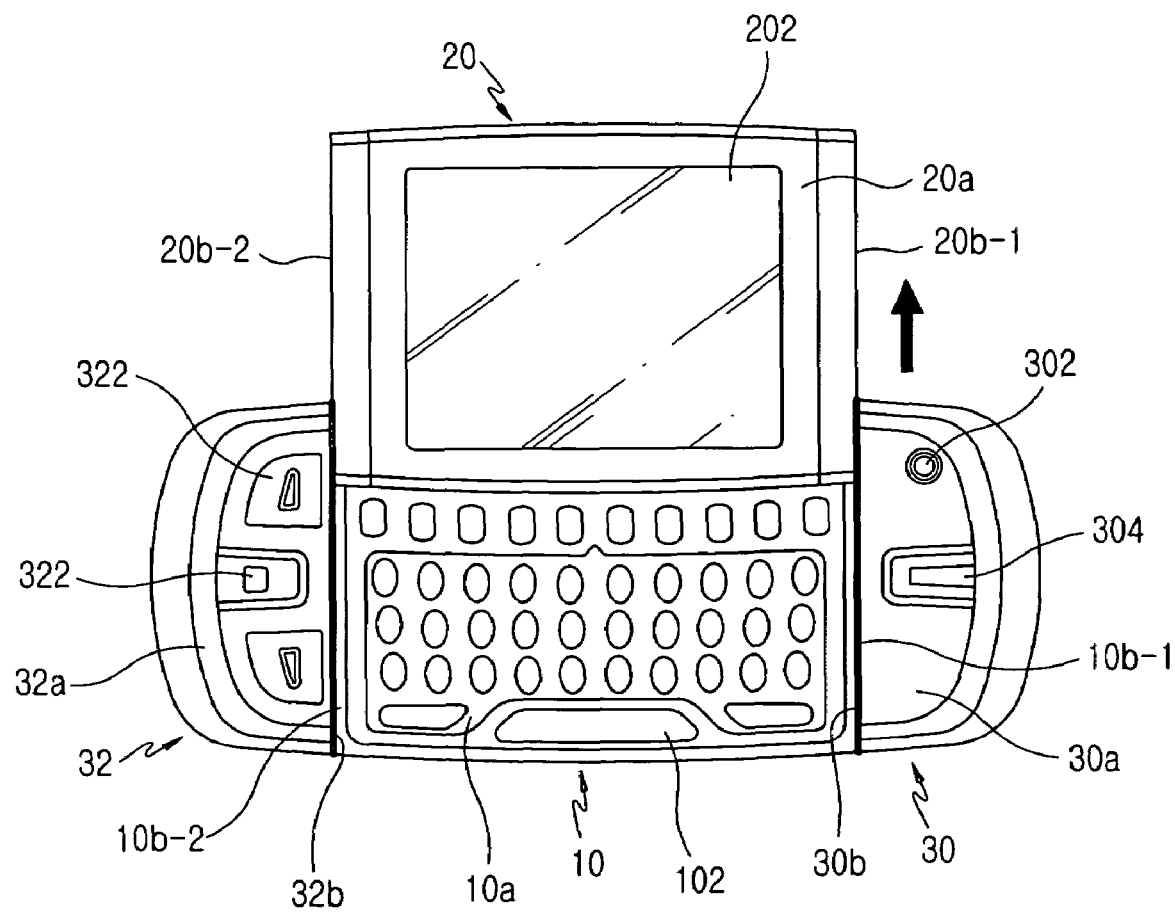
FIG. 4 is a plane view of the portable digital communication device showing the center sliding housing of the portable digital communication device of FIG. 1 moved so that the portable digital communication device is in a PDA operating mode.
Figure 5:
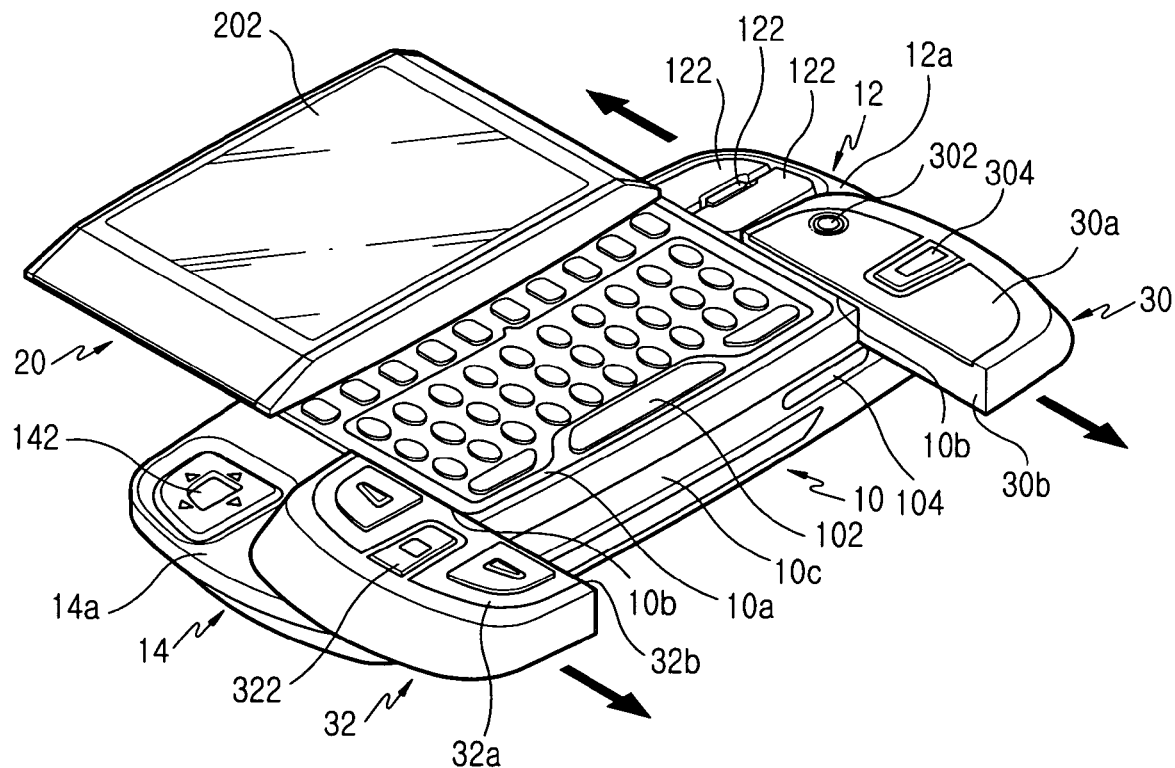
FIG. 5 is a plane view of the portable digital communication device showing the center sliding housing and the side sliding housings of the portable digital communication device of FIG. 1 moved so that the portable digital communication device is in a game operating mode.
Figure 6:
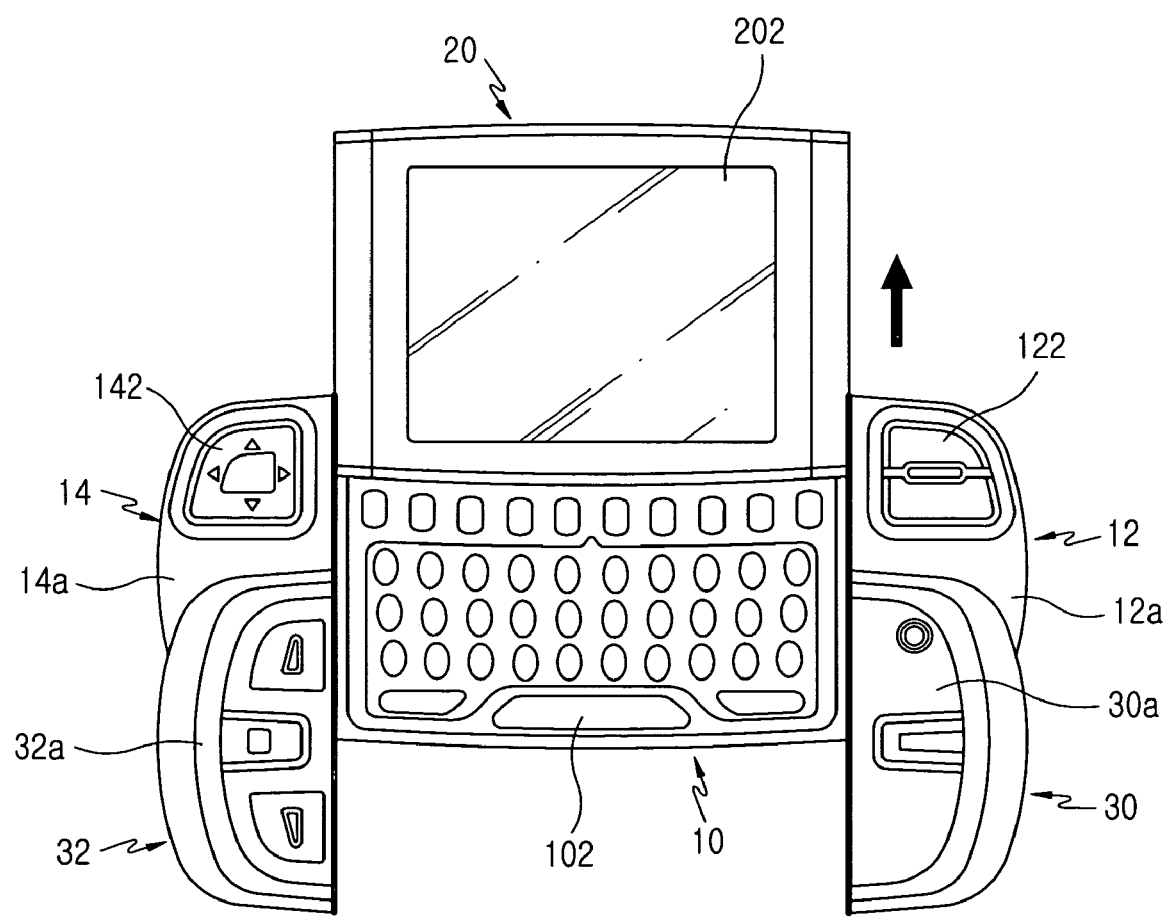
FIG. 6 is a plane view of the portable digital communication device shown in FIG. 5.

FIG. 4 shows the portable digital communication device in the PDA operating mode. On the other hand, FIGS. 5 and 6 show the portable digital communication device in the game operating mode.

Figure 7:
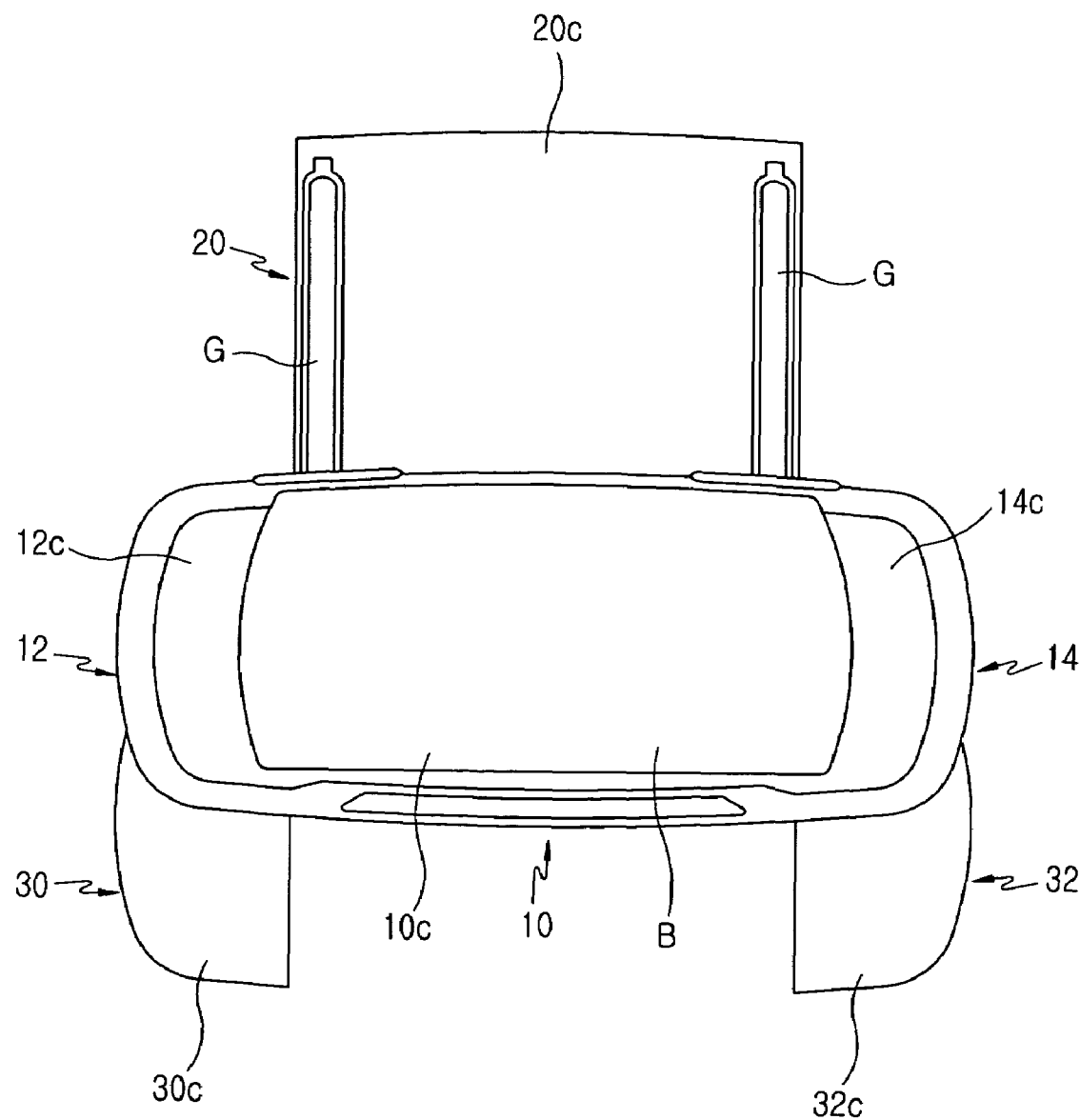
FIG. 7 is a bottom view of the portable digital communication device shown in FIG. 5.

On the bottom surface 20c of the center sliding housing 20 are formed guide rails as shown in FIG. 7. FIG. 7 also shows the bottom surfaces 30c and 32c of the first and second side sliding housings 30 and 32, and the bottom surfaces 12c and 14c of the first and second stationary housings 12 and 14. To the bottom surface of the body housing 10 is attached a battery pack B for supplying current to the portable digital communication device. The battery pack B can be detached from the body housing 10.

As apparent from the above description, the portable digital communication device of the present invention can be conveniently used in a game operating mode as well as in a PDA operating mode. Furthermore, the portable digital communication device of the present invention has the effect that a key operation is very convenient in the game operating mode.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A portable digital communication device usable as a gaming device and a personal digital assistant, comprising:
   a body housing;
   a center sliding housing for opening or closing a top surface of the body housing while being continuously opposite to the top surface of the body housing; and
   at least one side sliding housing attached to a side surface of the body housing and adapted to slide while being continuously opposite to the side surface of the body housing, the side sliding housing being arranged in parallel with the center sliding housing,
   wherein the side sliding housing comprises a first side sliding housing attached to one side surface of the body housing, and a second side sliding housing attached to the other side surface of the body housing, and wherein the first and second side sliding housings are arranged symmetrically to each other about the body housing.

2. The device as set forth in claim 1, wherein the side sliding housing includes a side surface moved in a sliding motion while being continuously opposite to a side surface of the center sliding housing.

3. The device as set forth in claim 1, wherein the center sliding housing and the side sliding housing are moved in a sliding motion in opposite directions.

4. The device as set forth in claim 1, further comprising a first key array arranged on the top surface of the body housing, the first key array comprising a plurality of keys.

5. The device as set forth in claim 1, wherein the center sliding housing includes a top surface having a wide display unit arranged thereon.

6. The device as set forth in claim 1, wherein the lengths of the body housing and the center sliding housing are larger than the widths of the body housing and the center sliding housing.

7. The device as set forth in claim 1, wherein the first side sliding housing includes a top surface having a single key and a camera lens mounted thereon, the camera lens being disposed next to the single key.

8. The device as set forth in claim 1, wherein the second side sliding housing includes a top surface having a second key array mounted thereon, the second key array comprising at least one key.

9. A portable digital communication device usable as a game machine and a personal digital assistant, comprising:
   a body housing;
   at least one stationary housing extendable in a horizontal direction to the body housing;
   a center sliding housing for opening or closing a top surface of the body housing while being continuously opposite to the top surface of the body housing; and
   at least one side sliding housing attached to a side surface of the body housing and adapted to slide while being continuously opposite to the side surface of the body housing, the side sliding housing being arranged in parallel with the center sliding housing and adapted to slide while being continuously opposite to a top surface of the stationary housing for opening or closing the top surface of the stationary housing,
   wherein the stationary housing comprises a first stationary housing formed at one side surface of the body housing, and a second stationary housing formed at the other side surface of the body housing, the first and second stationary housings being spaced apart from each other and arranged in a symmetrical fashion, and further
   wherein the side sliding housing comprises a first side sliding housing attached to one side surface of the body housing for opening or closing in a sliding motion a top surface of the first stationary housing, and a second side sliding housing attached to the other side surface of the body housing for opening or closing in a sliding motion a top surface of the second stationary housing, the first and second side sliding housings being arranged symmetrically to each other about the body housing.

10. The device as set forth in claim 9, wherein the side sliding housing includes a side surface moved in a sliding motion while being continuously opposite to a side surface of the center sliding housing.

11. The device as set forth in claim 9, wherein the center sliding housing and the side sliding housing are moved in a sliding motion in opposite directions.

12. The device as set forth in claim 9, further comprising a first key array arranged on the top surface of the body housing, the first key array comprising a plurality of keys.

13. The device as set forth in claim 9, wherein the center sliding housing includes a top surface having a display unit arranged thereon.

14. The device as set forth in claim 9, wherein the lengths of the body housing and the center sliding housing are larger than the widths of the body housing and the center sliding housing.

15. The device as set forth in claim 9, wherein the first side sliding housing includes a top surface having a single key and a camera lens mounted thereon, the camera lens being disposed next to the single key.

16. The device as set forth in claim 9, wherein the second side sliding housing includes a top surface having a second key array mounted thereon, the second key array comprising at least one key.

17. The device as set forth in claim 9, wherein the first stationary housing includes a top surface having a third key array mounted thereon, the third key array comprising a plurality of keys, and wherein the second stationary housing includes a top surface having a fourth key array mounted thereon, the fourth key array comprising a plurality of keys.

18. The device as set forth in claim 9, wherein the stationary housing and the side sliding housing are arranged symmetrically to each other about the body housing.

19. The device as set forth in claim 9, wherein the top surface of the body housing and the top surface of the stationary housing together form a step-shaped portion.

20. The device as set forth in claim 9, wherein the body housing includes a front surface having a fifth key array mounted thereon, the fifth key array comprising at least one key.

* * * * *